(12) United States Patent
Kang

(10) Patent No.: US 7,558,600 B2
(45) Date of Patent: Jul. 7, 2009

(54) MOBILE COMMUNICATION TERMINAL AND METHOD OF CONTROL THROUGH PATTERN RECOGNITION

(75) Inventor: Deokhun Kang, Seoul (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 11/849,251

(22) Filed: Aug. 31, 2007

(65) Prior Publication Data

US 2008/0058007 A1 Mar. 6, 2008

(30) Foreign Application Priority Data

Sep. 4, 2006 (KR) .................... 10-2006-0084892

(51) Int. Cl.
*H04M 1/00* (2006.01)

(52) U.S. Cl. ................. 455/556.1; 455/418; 455/414.1; 455/456.1; 455/557; 455/566; 702/150; 702/141

(58) Field of Classification Search ............. 455/556.1, 455/556.2, 418, 414.1, 566, 557; 345/173; 702/150, 141
See application file for complete search history.

(56) References Cited

U.S. PATENT DOCUMENTS

2005/0234676 A1* 10/2005 Shibayama ................. 702/141
2006/0071914 A1* 4/2006 Kuroume et al. ............ 345/173
2006/0279552 A1* 12/2006 Tonouchi .................... 345/173

* cited by examiner

*Primary Examiner*—Charles N Appiah
*Assistant Examiner*—Michael T Vu
(74) *Attorney, Agent, or Firm*—Lee, Hong, Degerman, Kang & Waimey

(57) ABSTRACT

A method for controlling a mobile terminal through pattern recognition and a mobile communication terminal for the same is provided. The method includes, receiving user input via contact with a touchscreen, determining whether the user input is at least one of a function indicating pattern and an operation indicating pattern, and performing, responsive to the user input, at least one of a function corresponding to the function indicating pattern and an operation corresponding to the operation indicating pattern.

12 Claims, 15 Drawing Sheets

MOBILE COMMUNICATION TERMINAL AND METHOD OF CONTROL THROUGH PATTERN RECOGNITION

CROSS-REFERENCE TO RELATED APPLICATIONS

Pursuant to 35 U.S.C. §119(a), this Nonprovisional application claims the benefit of earlier filing date and right of priority to Korean Application No. 10-2006-0084892 filed in Korea on Sep. 4, 2006 the entire contents of which are hereby incorporated by reference.

FIELD OF THE INVENTION

This document relates to a mobile communication terminal and a method of controlling the mobile communication terminal through pattern recognition.

DISCUSSION OF RELATED ART

As the demand for mobile communication terminals rapidly increases, a variety of convenient services and functions are provided to mobile communication terminal users. The mobile communication terminals are equipped with an input device having key buttons for selecting menus and functions provided in various ways. The user can select a desired menu and function by manipulating the input device.

The user can enter a menu providing a corresponding function and then select a desired function, by using the input device. However, in the case where sub menus include several steps, there is a problem in that the user must manipulate several keys provided in the input device several times. Further, the user must use keys set for respective functions that may be undesired by the user.

SUMMARY

In one general aspect of the present invention, there is provided a method for controlling a mobile terminal through pattern recognition, the method includes receiving user input via contact with a touchscreen, determining whether the user input is at least one of a function indicating pattern and an operation indicating pattern, and performing, responsive to the user input, at least one of a function corresponding to the function indicating pattern and an operation corresponding to the operation indicating pattern.

It is contemplated that the method further includes storing data having an input function indicating pattern as corresponding to a particular function and an operating indicating pattern as corresponding to a particular operation, and wherein the determining includes classifying the user input as either the function indicating pattern or the operation indicating pattern based upon the stored data.

It is further contemplated that the method includes switching a mode of the mobile terminal to indicate that the user input represents at least one of the function indicating pattern and the operation indicating pattern.

It is contemplated that the switching is either responsive to voice commands received by a voice recognition unit or is responsive to input received by a key input unit. It is further contemplated that the method includes displaying the mode switch on the touchscreen as an icon.

It is contemplated that when the operation corresponding to the operation indicating pattern of the input pattern is performed, a level of operation is controlled according to a length of the input operation indicating pattern. It is further contemplated that when the input pattern is the function indicating pattern, after the function corresponding to the function indicating pattern is performed, a level bar indicating the level of operation is displayed.

It is contemplated that after the function corresponding to the function indicating pattern of the input pattern is executed, a list of operations associated with the executed function is displayed. It is further contemplated that a plurality of function indicating patterns and operation indicating patterns, which can be set in the specific function, are stored, and the function indicating patterns and the operation indicating patterns are set by a user selection.

It is additionally contemplated that the function indicating pattern and the operation indicating pattern corresponding to the specific function are directly input and set on the touchscreen by a user.

In another aspect of the present invention, a mobile terminal is provided, including an input unit for inputting an input pattern for controlling the mobile terminal through pattern recognition, a display having a touchscreen for inputting the input pattern, and a controller for analyzing the input pattern, classifying the input pattern into at least one of a function indicating pattern and an operation indicating pattern, and controlling one of a function corresponding to the function indicating pattern and an operation corresponding to the operation indicating pattern to be executed according to the classification.

It is contemplated that the mobile terminal further includes a memory for storing the function indicating pattern set to correspond to a specific function, and the operation indicating pattern set to correspond to an operation performed by the specific function, wherein the controller determines if the input pattern comprises at least one of the function indicating pattern and the operation indicating pattern stored in the memory, and classifies the input pattern into the function indicating pattern and the operation indicating pattern.

It is further contemplated that the mobile terminal includes a mode switch for indicating that the input pattern represents at least one of the function indicating pattern and the operation indicating pattern, wherein the controller classifies the input pattern, into the function indicating pattern and the operation indicating pattern when the mode switch is selected.

It is contemplated that the mode switch responds to at least one of voice commands received by a voice recognition unit and an input received by a key input unit. It is further contemplated that the mode switch displays on the touchscreen as an icon.

It is contemplated that when the operation corresponding to the operation indicating pattern of the input pattern is performed, the controller controls a level of operation according to a length of the input operation indicating pattern. It is further contemplated that when the input pattern is the function indicating pattern, after a function corresponding to the function indicating pattern is performed, a level bar indicating the level of operation is displayed.

It is contemplated that after the function corresponding to the function indicating pattern of the input pattern is executed, the controller displays a list of operations associated with the executed function. It is further contemplated that a plurality of function indicating patterns and operation indicating patterns, which can be set in the specific function, are stored, and the function indicating patterns and the operation indicating patterns are set by a user selection.

It is also contemplated that the function indicating pattern and the operation indicating pattern corresponding to the specific function are directly input and set on the touchscreen by a user.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed. These and other embodiments will also become readily apparent to those skilled in the art from the following detailed description of the embodiments having reference to the attached figures, the invention not being limited to any particular embodiments disclosed.

Figure 3:
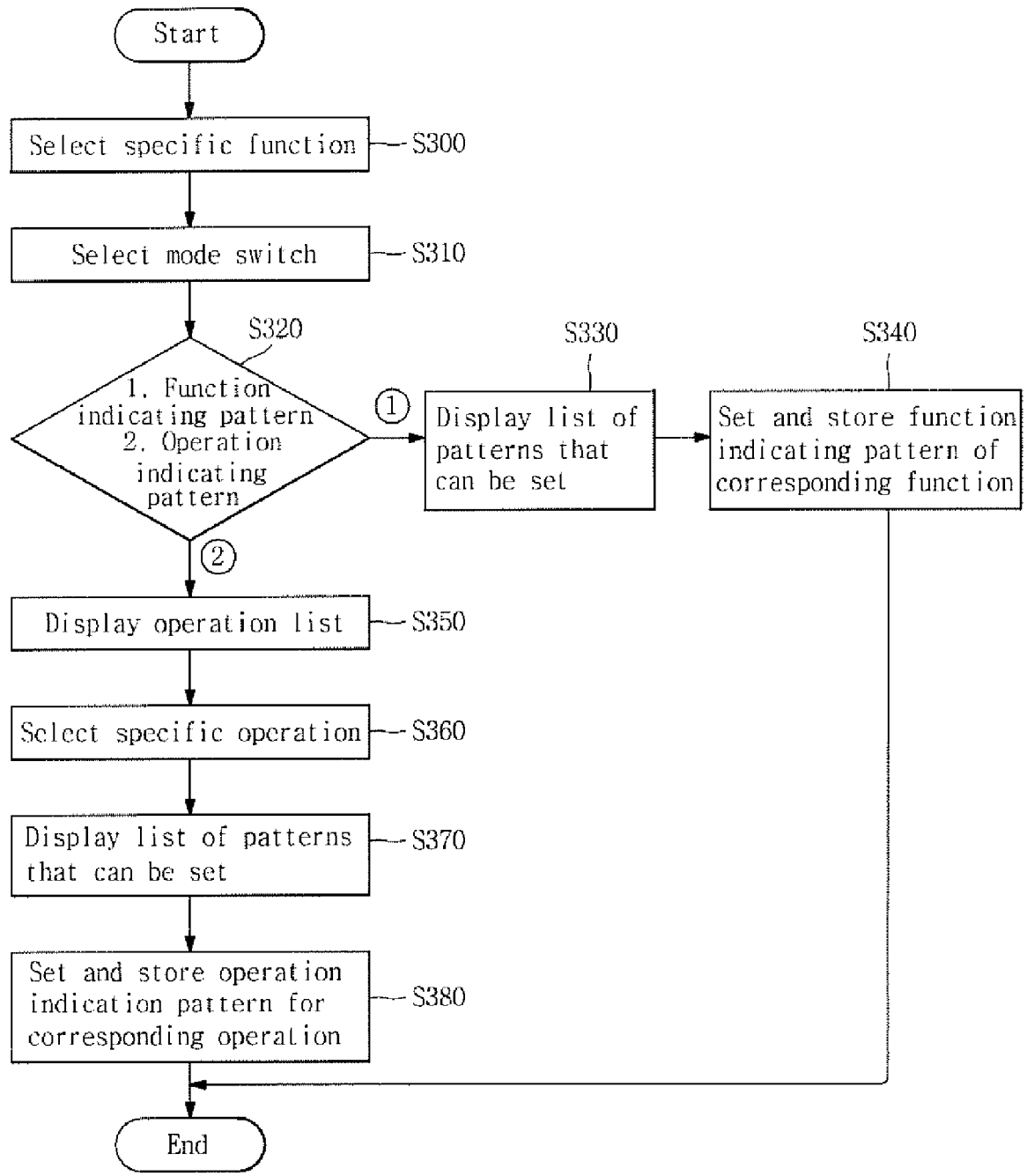
FIG. 3 is a flowchart illustrating a method of setting a function indicating pattern and an operation indicating pattern according to an embodiment of the present invention.

FIG. (5a)-(5c) illustrate an example in which the operation indicating pattern is set according to the method illustrated in FIG. 3.

Figure 6A:
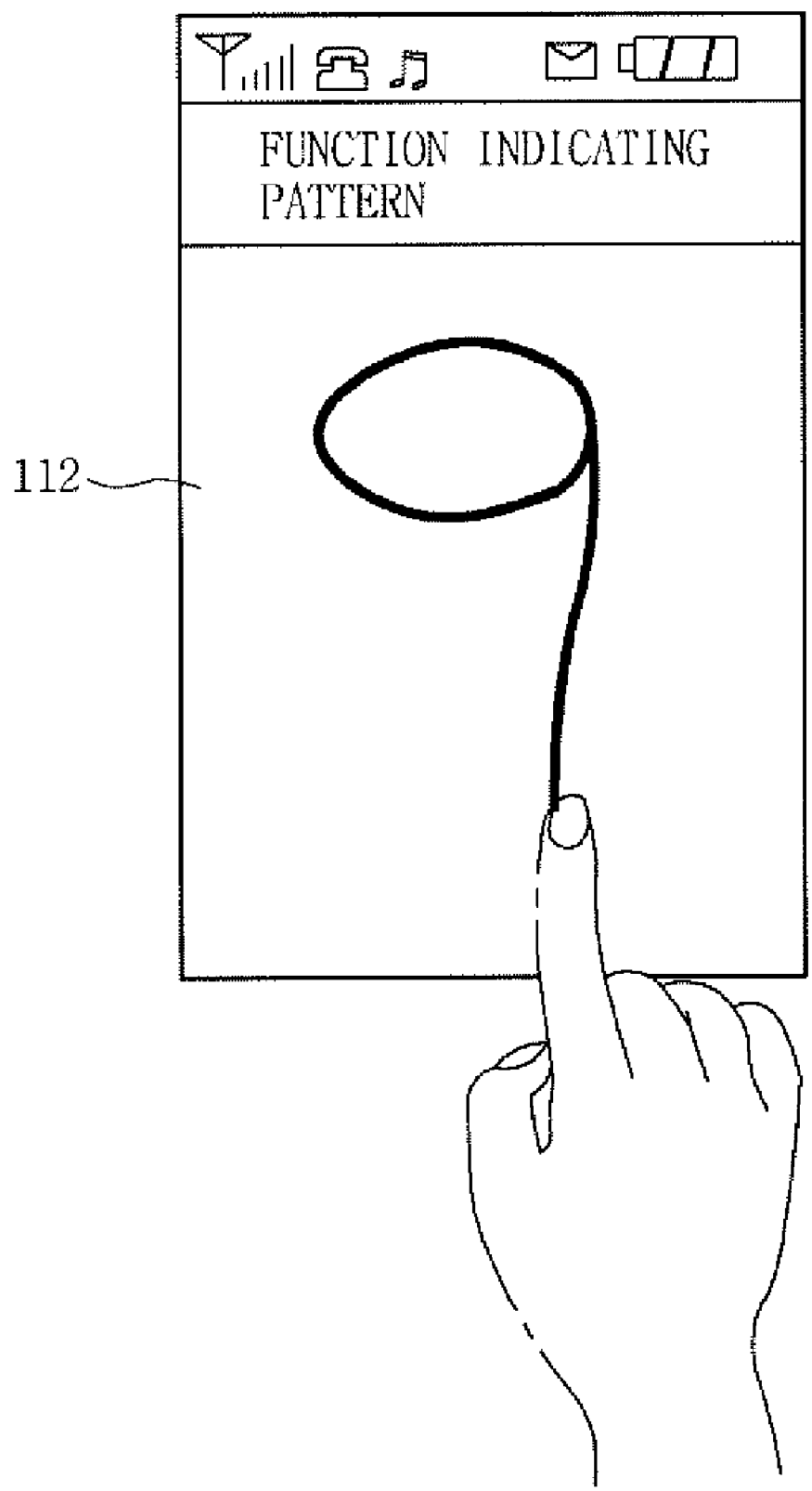
Figure 6B:
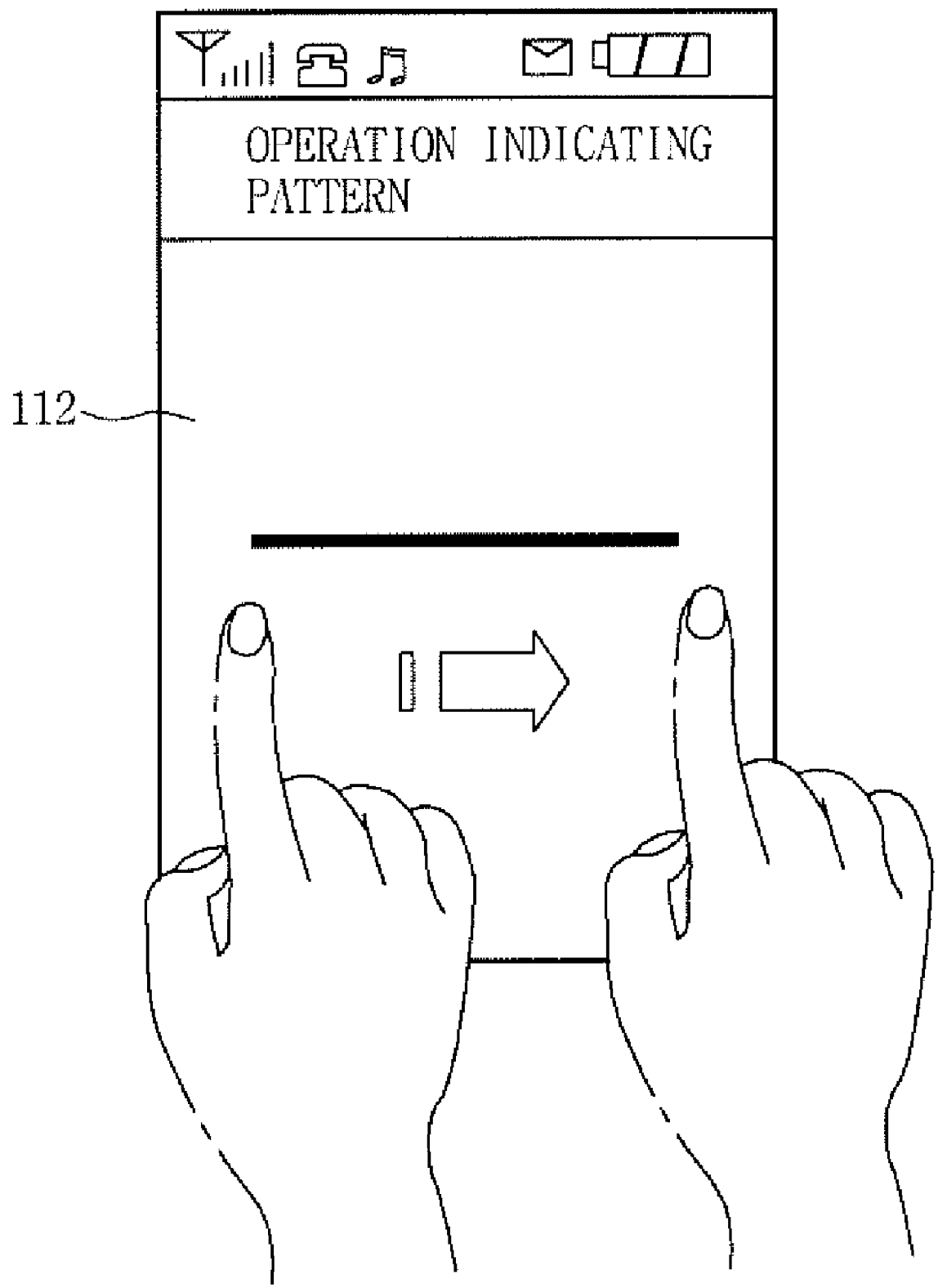

FIGS. 6(a) and 6(b) illustrate examples in which a user sets a pattern by arbitrarily inputting the pattern.

Figure 7:
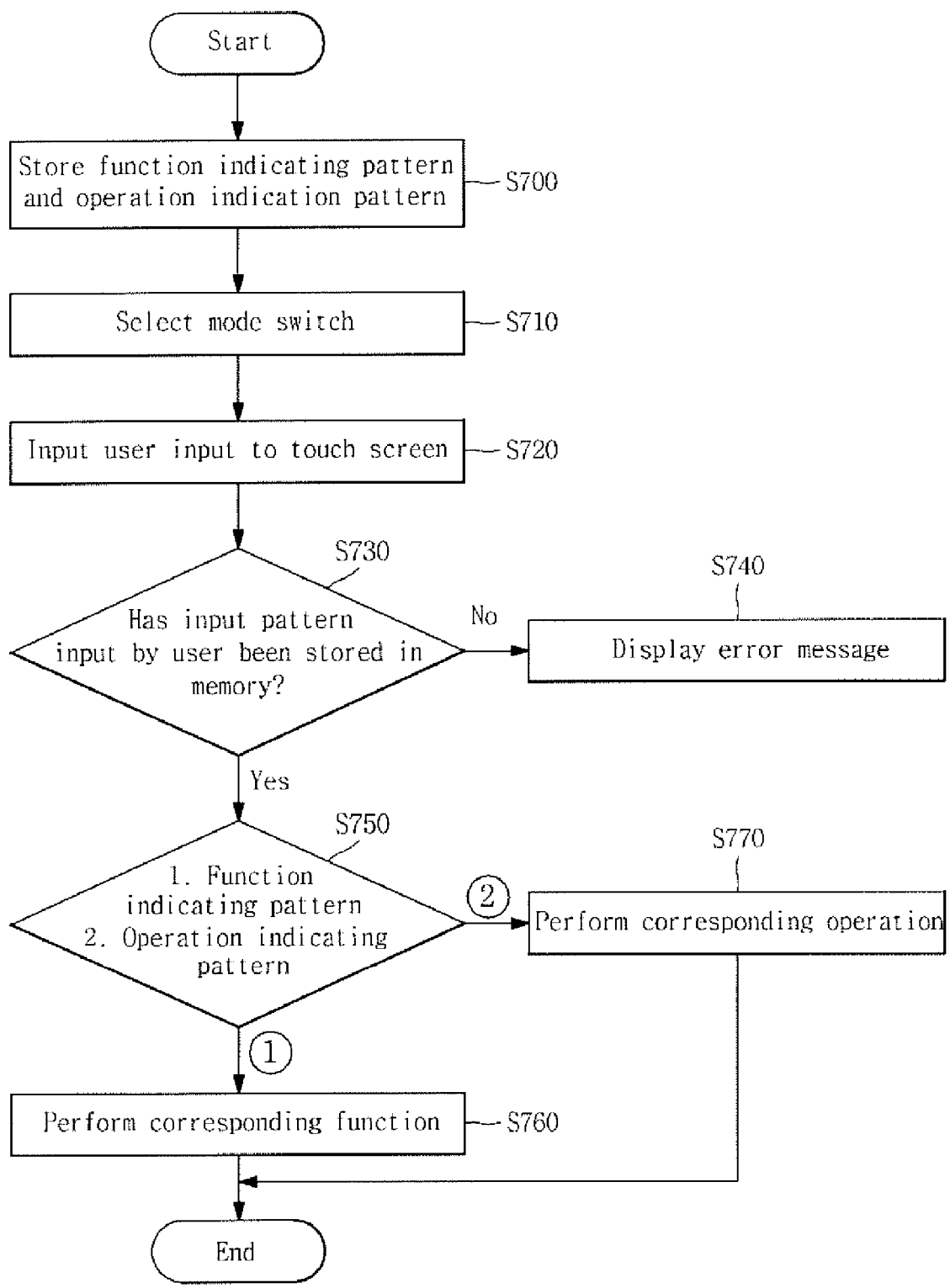

FIG. 7 is a flowchart illustrating a method of controlling a mobile terminal through pattern recognition according to an embodiment of the present invention.

FIGS. 8(a)-8(d) illustrate the stored function indicating pattern and the operation indicating pattern performed according to an embodiment of the present invention.

FIGS. 9(a)-9(d) illustrate how the level of operation is controlled according to the length of an input operation indicating pattern.

Figure 10:
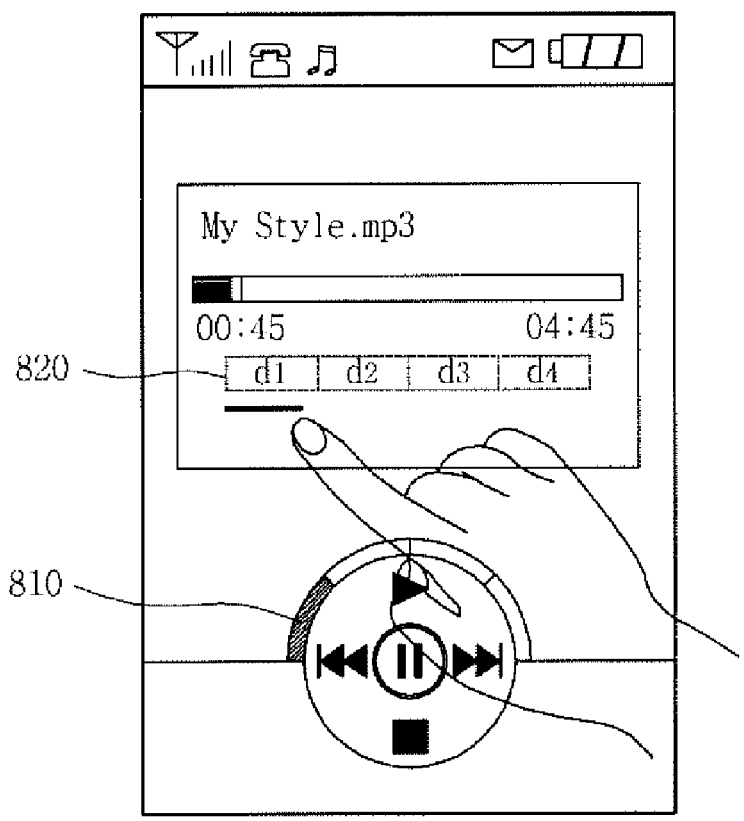

FIG. 10 illustrates an example in which the amount of an operation is easily controlled when the operation indicating pattern is input.

Figure 11A:
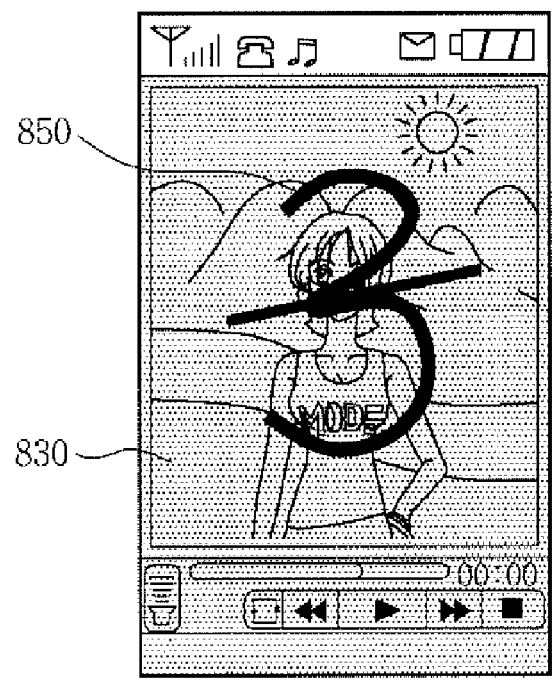
Figure 11B:
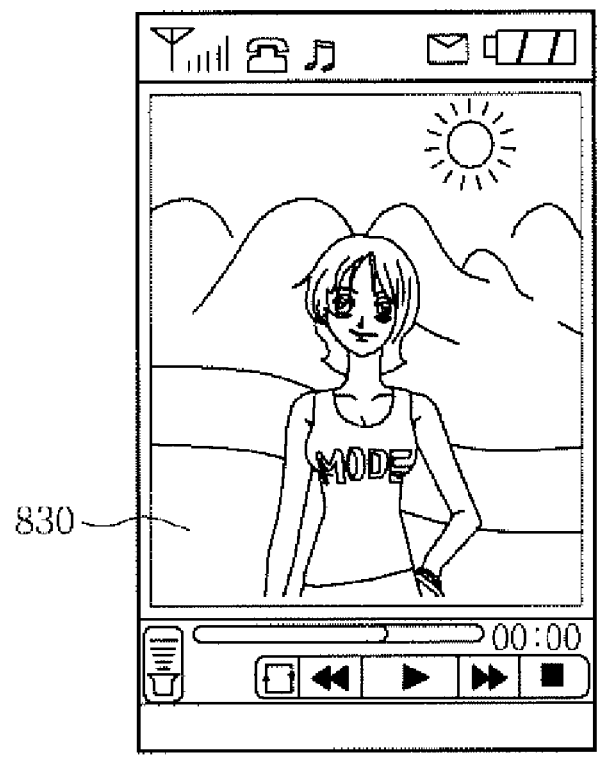

FIGS. 11(a) and 11(b) illustrate a function indicating pattern and an operation indicating pattern of a picture view function input according to an embodiment of the present invention.

Figure 12A:
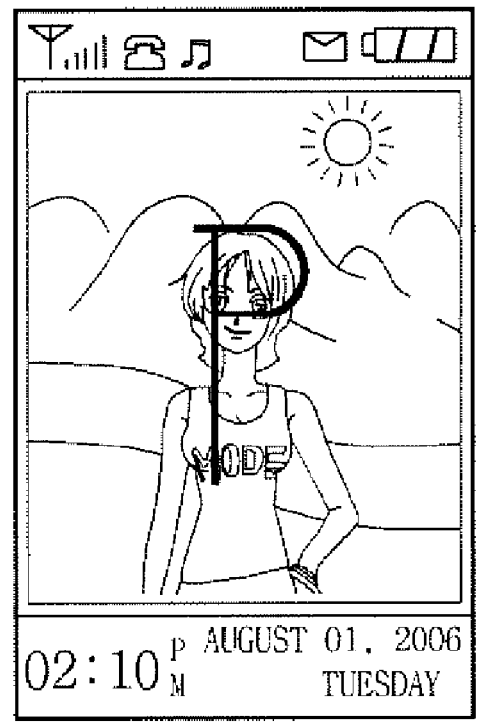
Figure 12B:
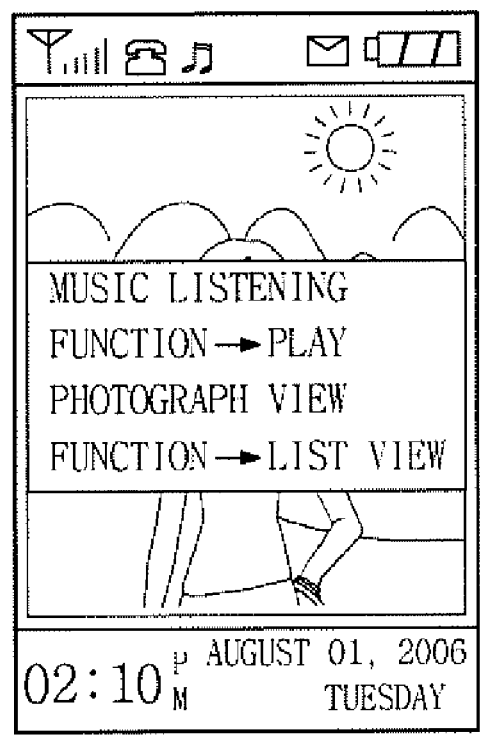

FIGS. 12(a) and 12(b) illustrate an example in which the operation indicating pattern is input in a state where the function indicating pattern is not input.

Figure 13:
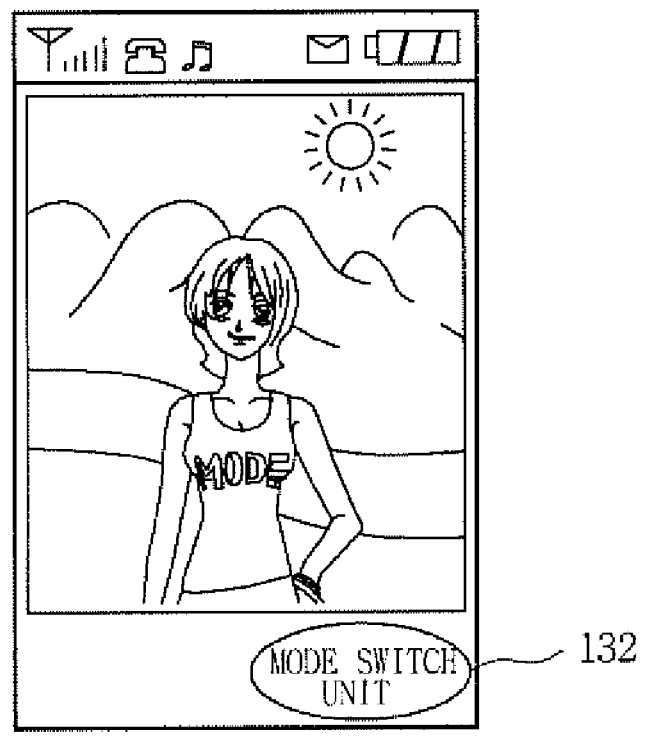

FIG. 13 illustrates an example in which a mode switch is displayed on a touchscreen in icon form.

DETAILED DESCRIPTION OF PREFERRED EMBODIMENTS

The details of one or more implementations are set forth in the accompanying drawings and the description below. In the entire description of this document, like reference numerals represent corresponding parts throughout various figures.

A mobile communication terminal according to the present invention may comprise a mobile terminal, a personal digital assistant, a personal communication system, or other related devices.

Figure 1:
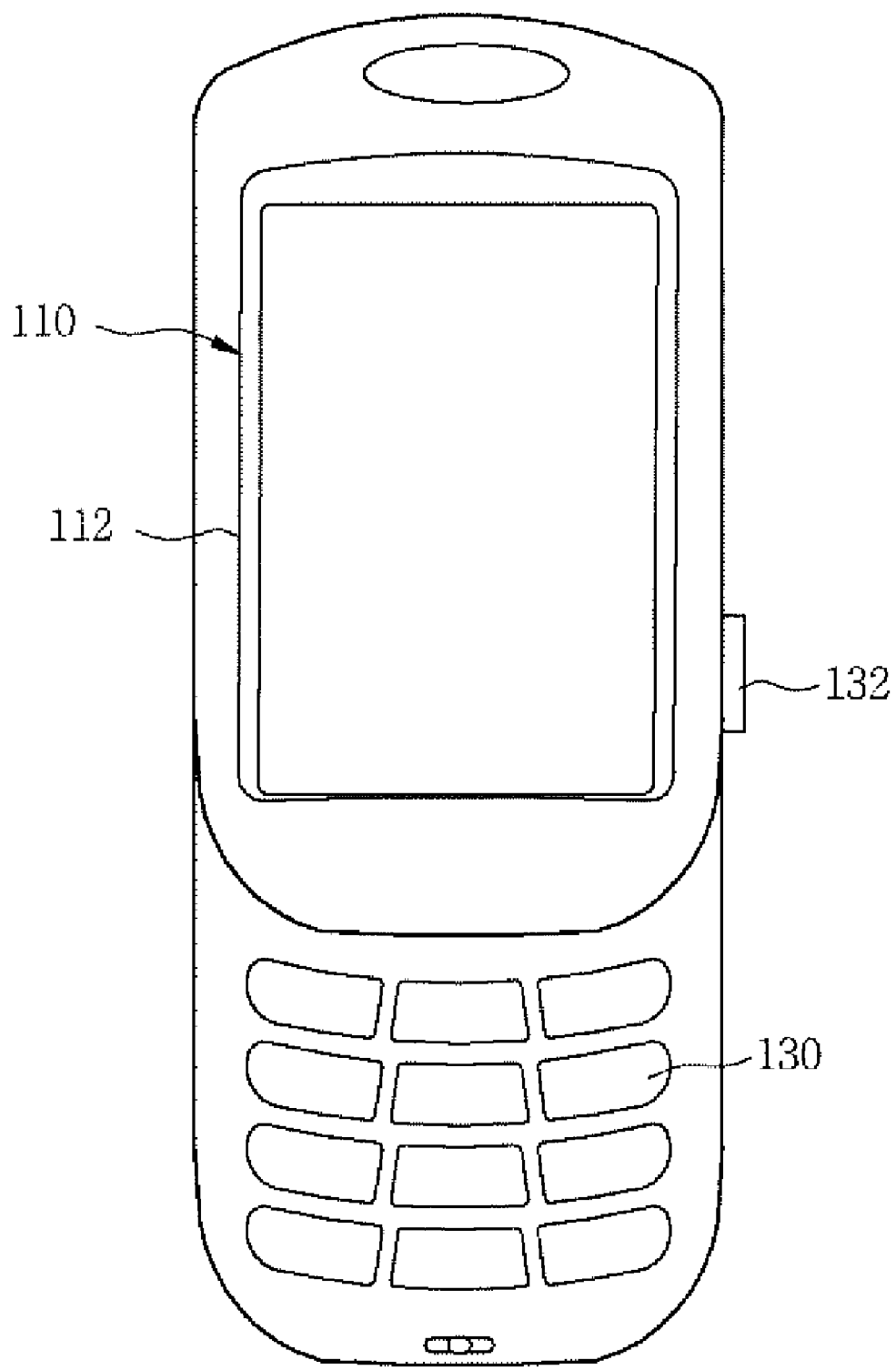
FIG. 1 is a front view of a mobile terminal according to an embodiment of the present invention.

FIG. 1 is a front view of a mobile terminal 100 according to an embodiment of the present invention. Referring to FIG. 1, a mobile communication terminal 100 includes a display 110 equipped with a touchscreen 112, an input unit 130 equipped with a mode switch 132.

The mobile terminal 100 is adapted to recognize input patterns, input through the touchscreen 112, as a function indicating pattern and an operation indicating pattern in a state where the mode switch 132 is selected. This is described below with reference to FIG. 2.

Figure 2:
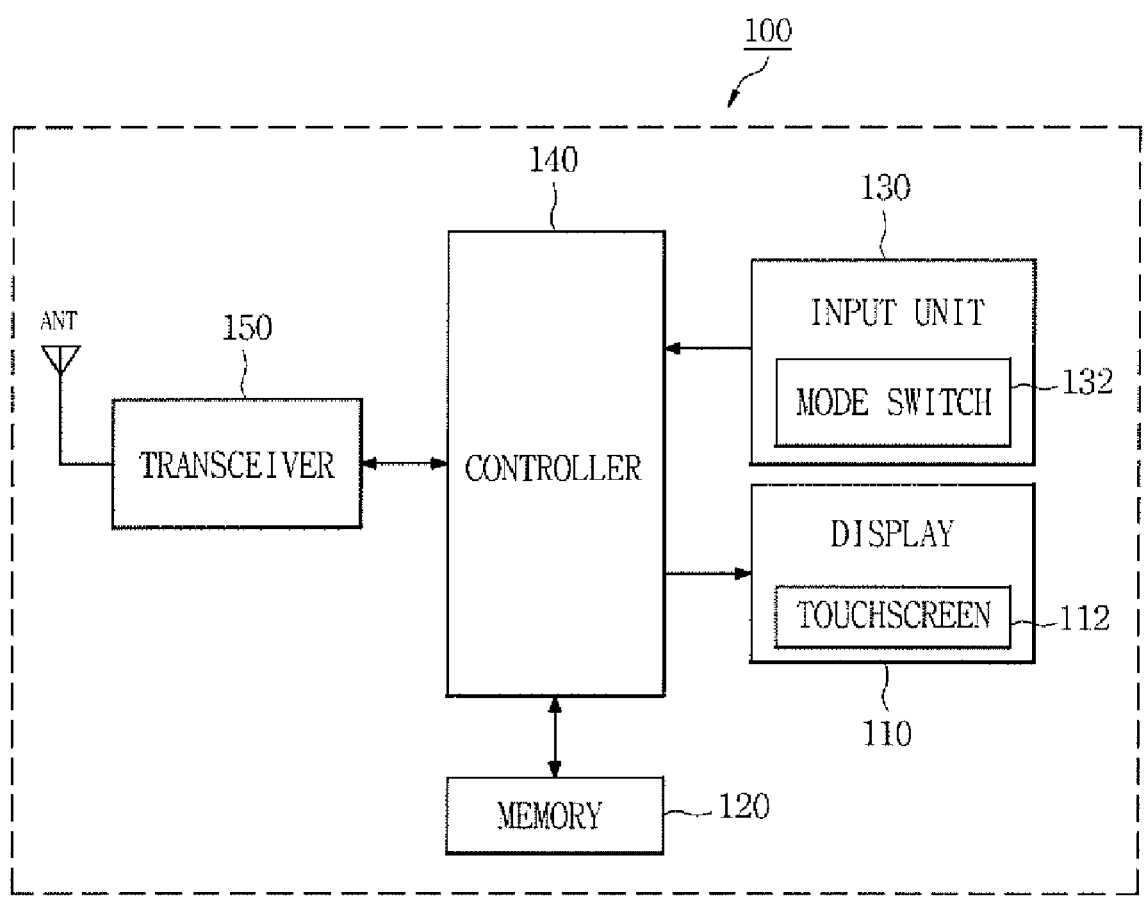
FIG. 2 is a block diagram of the mobile terminal of FIG. 1.

FIG. 2 is a block diagram of the mobile terminal 100 of FIG. 1. Referring to FIG. 2, the mobile terminal 100 includes a transceiver 150, the display 110, a memory 120, the input 130 and a controller 140.

The transceiver 150 receives data from a base station via an antenna ANT through communication with the base station, and transmits data, generated by the mobile terminal, to the base station through the antenna ANT.

The display 110 displays content, including various information signals, etc., which are received from the transceiver 150. The display 110 includes a touchscreen 112, and receives touch input from a user through the touchscreen 112.

The touchscreen 112 is a screen in which an instruction is inputted for execution when a user contacts the screen, using a finger(s) or a ball pen-shaped touch pen. The location of a cursor can be moved by recognizing a portion at which the touch occurs. The touchscreen 112 may employ various methods of operation.

Examples of such methods include a pressure-sensitive method of responding to pressures applied to the screen surface, an electrostatic method of determining a place at which a touch occurs by sensing the degree of charges lost when sensors are touched in a state where the flow of charged current is charged on the screen surface and the sensors are installed around the current, and an infrared method of detecting a contact location by sensing that infrared rays are precluded in a state where the infrared rays are disposed around the screen.

The memory 120 may include a flash memory, RAM, or Electrically Erasable Programmable Read Only Memory (EEPROM). The memory 110 stores a program for controlling an overall operation of the mobile communication terminal 100. The memory 120 further stores a function indicating pattern set corresponding to a specific function, and an operation indicating pattern set corresponding to an operation performed by a specific function.

The input unit 130 is equipped with numeric keys and a variety of function keys, and outputs a signal corresponding to a key, selected by a user, to the controller 140. The input unit 130 further comprises the mode switch 132 for recognizing input patterns input to the touchscreen 112 as the function indicating pattern and the operation indicating pattern. The mode switch 132 can be a side key located on the side of the mobile terminal 100.

The controller 140 controls general input and output of the mobile terminal 100. The controller 140 analyzes an input pattern input to the touchscreen 112. If the input pattern is determined to be a function indicating pattern stored in the memory 120, then the controller 140 controls a function corresponding to the function indicating pattern to be executed. If, as a result of the analysis, the input pattern is the operation indicating pattern to perform the operation of a specific function, which is stored in the memory 120, the controller 140 controls an operation corresponding to the operation indicating pattern to be executed.

The operation of the mobile terminal 100 is described below. In accordance with an embodiment of the present invention, the function indicating pattern and the operation indicating pattern can be previously set, as described below.

1. A User Selects and Sets One of a Plurality of Previously Set Patterns.

Figure 4A:
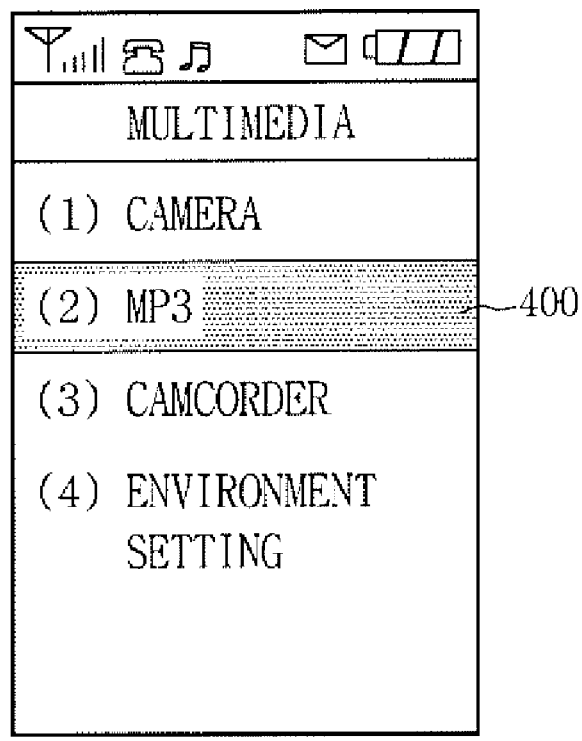
FIGS. 4(a)-4(c) illustrate an example in which the function indicating pattern is set according to the method illustrated in FIG. 3.
Figure 4B:
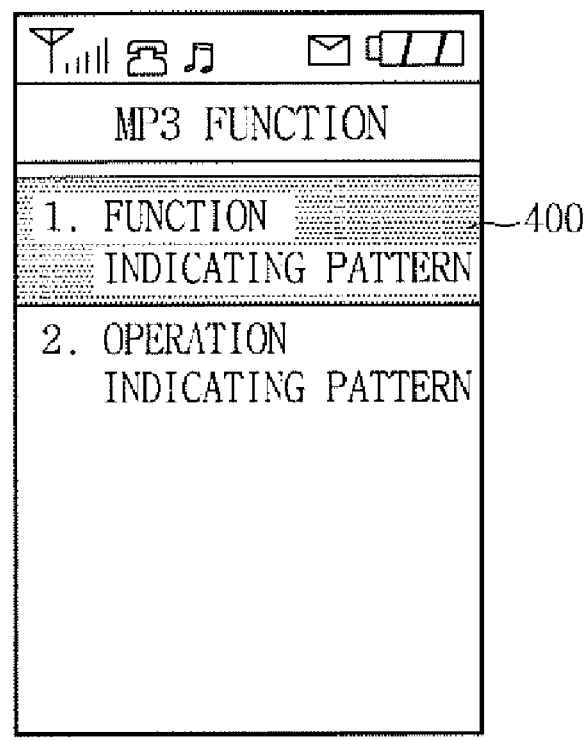
Figure 4C:
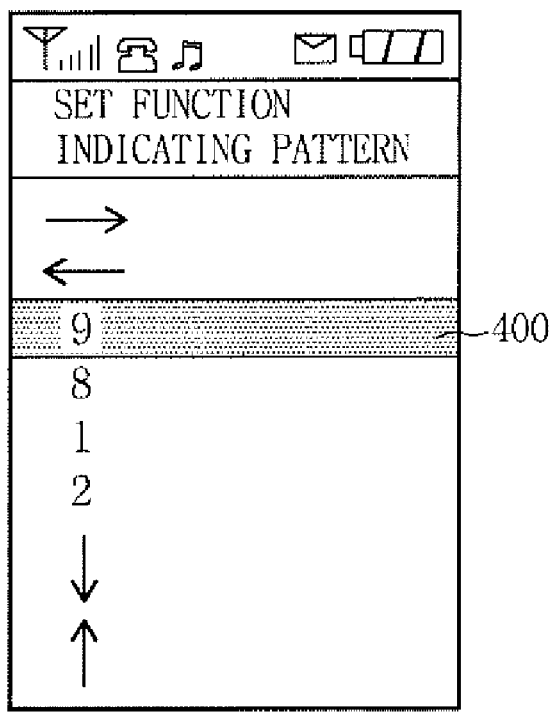
Figure 5A:
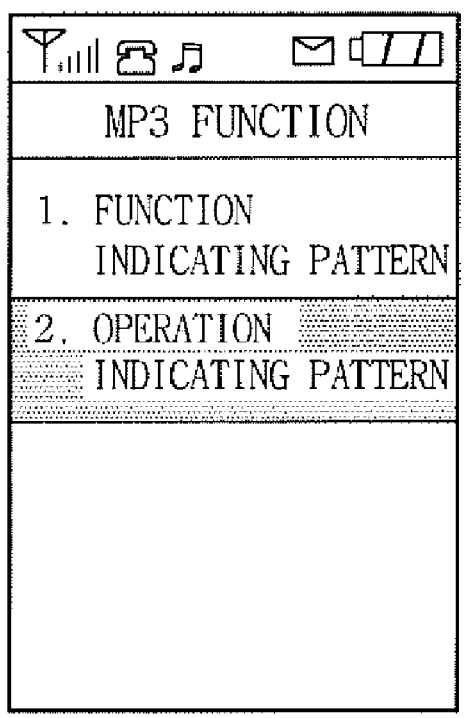
Figure 5B:
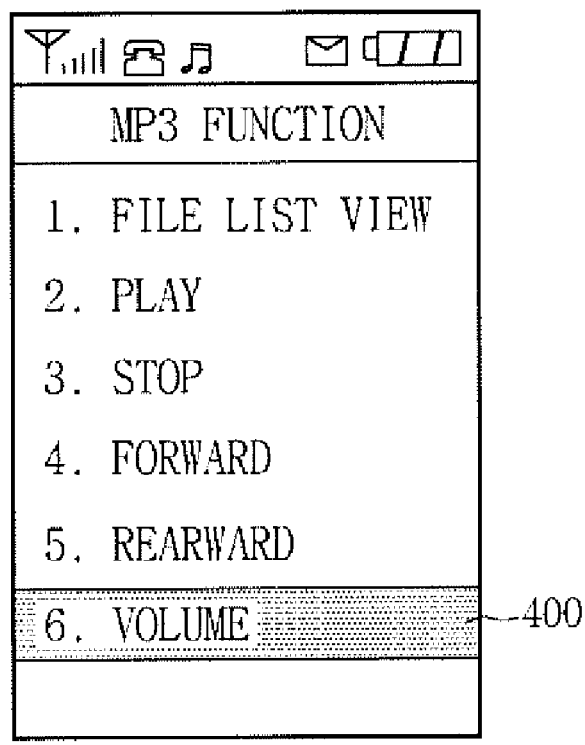
Figure 5C:
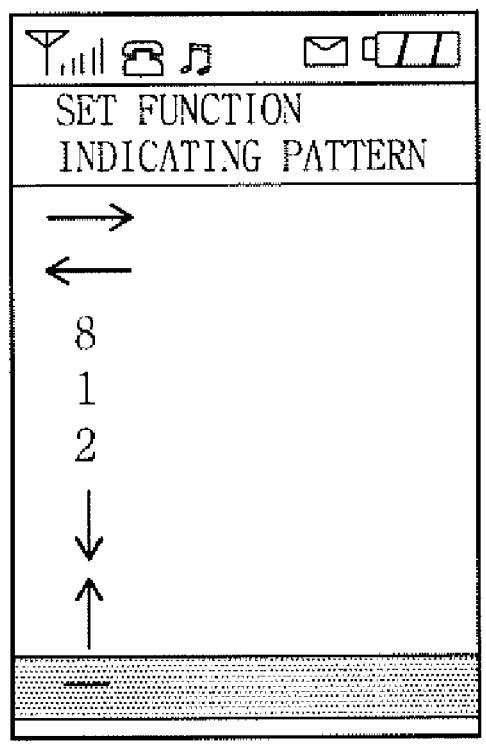

FIG. 3 is a flowchart illustrating a method of setting the function indicating pattern and the operation indicating pattern according to an embodiment of the present invention. FIGS. 4(a)-4(c) illustrate an example in which the function indicating pattern is set according to the method illustrated in FIG. 3. FIGS. 5(a)-5(c) also illustrate an example in which the operation indicating pattern is set according to the method illustrated in FIG. 3.

As illustrated in FIG. 3, the method of setting the function indicating pattern and the operation indicating pattern includes selecting a specific function (S300), selecting a mode switch (S310), and setting patterns for a function, operation and storing the set patterns (S320) to (S380).

If a user selects a multimedia menu in order to set the function and operation indicating patterns (S300), as illustrated in FIG. 4(a), the controller 140 displays the multimedia menu on the screen of the display. The user then selects the mode switch 132 in a state where a selection bar 400 is located at a function "(2) MP3", that is a specific function selected by the user to set the function and operation indicating patterns (S310).

Accordingly, the controller 140 controls the display 110 to display a screen illustrating "1. FUNCTION INDICATING PATTERN" and "2. OPERATION INDICATING PATTERN" for the function "(2.) MP3" can be selected and set, as illustrated in FIG. 4(b), (S320).

The function indicating pattern refers to a pattern to indicate functions provided by the mobile terminal 100, such as a telephone directory and a message box, as well as MP3, camera and camcorder multimedia. Furthermore, the operation indicating pattern refers to a pattern to instruct the execution of a detailed operation of a function in which the function indicating pattern is set. Specifically, in the case where the function indicating pattern for "MP3" is set, a pattern to instruct an operation of turning the volume of "MP3" up or down is the operation indicating pattern.

Accordingly, if the user selects "1. FUNCTION INDICATING PATTERN" for the function "MP3", the controller 140 controls the display 110 to display a pattern list that can be set in the function "MP3", as illustrated in FIG. 4(c), (S330). If the user sets "9" to the function indicating pattern of the function "MP3" by using the selection bar 400, the controller 140 stores the value in the memory 120 (S340).

As illustrated in FIG. 5(a), if it is determined that the user has selected "2. OPERATION INDICATING PATTERN" in order to set the operation of the function "MP3" (S320), then the controller 140 controls the display 110 to display a list of operations that can be performed by the function "MP3" (5350), as illustrated in FIG. 5(b).

The operations that can be performed by the function "MP3" may include a file list view, play, stop, forward, rearward, and volume. If the user selects the mode switch 132 with the selection bar 400 being placed at "6. VOLUME", then the controller 140 recognizes that "6. VOLUME" has been selected (S360).

Thereafter, as illustrated in FIG. 5(c), the controller 140 controls the display 110 to display a list of patterns that can be set to "6. VOLUME" (S370). In this state, if the user sets "-" to the operation indicating pattern corresponding to "6. VOLUME", the controller 140 controls the memory 120 to store it therein at step (S380).

2. A User Sets a Pattern by Arbitrary Input.

FIGS. 6(a) and 6(b) illustrate examples in which a user sets a pattern by arbitrarily inputting the pattern. First, the screen in which "1. FUNCTION INDICATING PATTERN" and "2. OPERATION INDICATING PATTERN" for the function "MP3" can be selected and set is displayed as described above (320).

In this state, if a user selects the input of "1. FUNCTION INDICATING PATTERN", the controller 140 displays a screen in which the user can directly input a specific pattern to the touchscreen 112, as illustrated in FIG. 6(a). If the user inputs "9" to the touchscreen 112, the controller 140 stores it in the memory 120.

When the input of the function indicating pattern is completed, the controller 140 displays a list of operations corresponding to the function indicating pattern as described above at (S350). If the user selects the operation "VOLUME", the controller 140 displays a screen in which the user can directly input a specific pattern to the touchscreen 112, as illustrated in FIG. 6(b). At this time, if the user inputs "-" to the touchscreen 112 and stores "-", the controller 140 stores it in the memory 120.

A method of executing a shortcut function for controlling a mobile terminal by recognizing a pattern input when the function indicating pattern and the operation indicating pattern are previously stored in the memory 120 as the function indicating pattern and the operation indicating pattern is described below with reference to FIG. 7.

FIG. 7 is a flowchart illustrating a method of controlling a mobile terminal through pattern recognition. FIGS. 8(a)-8(d) illustrate the stored function indicating pattern and the operation indicating pattern are performed according to an embodiment of the present invention.

As illustrated in FIG. 7, a method of executing a shortcut function through pattern recognition includes storing function indicating patterns and operation indicating patterns (S700), selecting a mode switch (S710), inputting user input to the touchscreen 112 (S720), pattern classification (S730) by analyzing an input pattern and classifying the pattern into either of the function indicating pattern or the operation indicating pattern (S750), and executing a function corresponding to the function indicating pattern (S760) or an operation corresponding to the operation indicating pattern (S770), according to the pattern classification.

As described above, a function indicating pattern and an operation indicating pattern, which are set by a user, are stored in the memory 120 at step S700. The user selects the mode switch 132 provided as a side key button, of the input 130 (S710). Accordingly, the controller 140 can recognize a pattern, inputted in to the touchscreen 112 by the user, as the function indicating pattern and the operation indicating pattern.

Figure 8A:
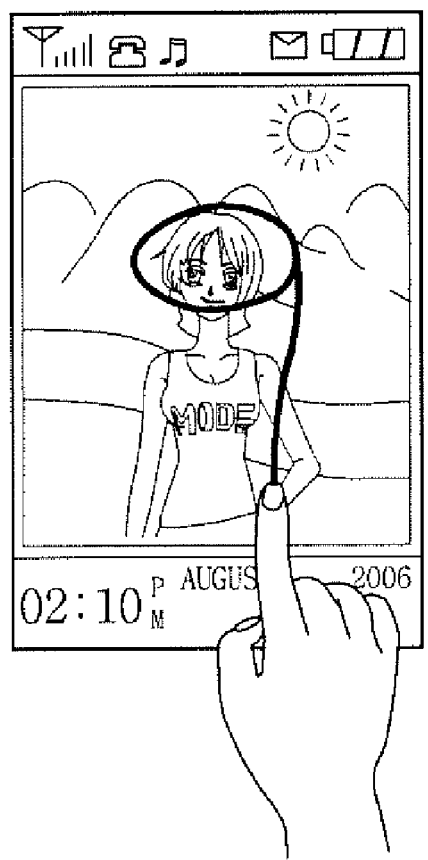

Thereafter, as illustrated in FIG. 8(a), the user inputs a pattern, such as "9", on the touchscreen 112 of the mobile communication terminal 100, which is in a standby state, through the touch input (S720). Accordingly, the controller 140 determines whether the touch input of the user is a pattern previously stored in the memory 120 (S730).

The touchscreen 112 is a pressure-sensitive screen in which sensor lines, which respond to pressures applied to the screen surface, are densely arranged. Accordingly, the touchscreen 112 perceives a location as coordinates when pressure is applied at the time of the touch input of the user, and outputs the coordinates to the controller 140. The controller 140 determines the shape of the input pattern based on the coordinates.

If, as a result of the determination, the touch input of the user is not a pattern previously stored in the memory 120 at (S730), then the controller 140 outputs an error message (S740). However, if the touch input of the user is a pattern previously stored in the memory 120 (S730), the controller 140 classifies a corresponding input pattern into "1. FUNCTION INDICATING PATTERN" and "2. OPERATION INDICATING PATTERN" (S750).

In this case, the controller 140 confirms that "9", which is the pattern input by the user, is the function indicating pattern that has been previously set to execute the function "MP3" and stored in the memory 120. The controller 140 confirms that "9", the pattern input by the user, is the function indicating pattern and that the operation indicating pattern has not been input, and therefore executes only a corresponding function.

Figure 8B:
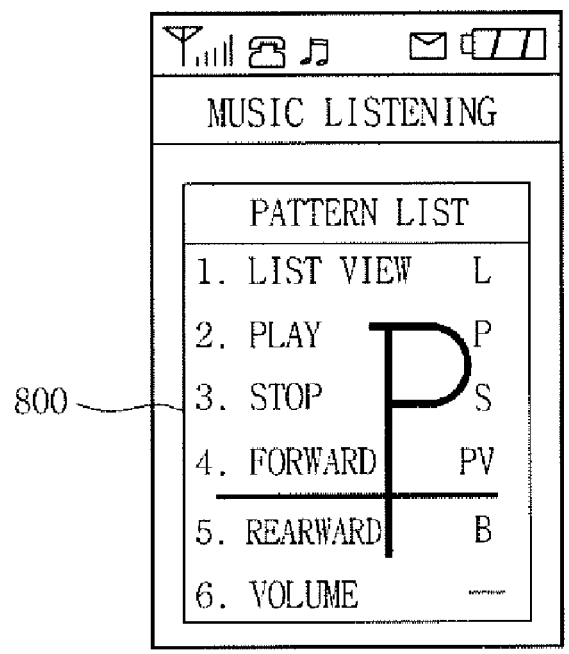

Thus, the controller 140 executes a menu "MUSIC LISTENING" (S760), as illustrated in FIG. 8(b). In this case, the controller 140 can display an operation indicating pattern list 800 in which "9", the pattern input by the user, is used in the menu "MUSIC LISTENING". The operation indicating pattern list 800 can be continuously displayed or can be selectively displayed when a corresponding function, such as the menu "MUSIC LISTENING," is executed. In order to selectively display the operation indicating pattern list 800, a specific button of the input unit 130 can be pressed.

Thereafter, if the user inputs "P" and "-", the controller 140 classifies them into the function indicating pattern and the operation indicating pattern. The controller 140 confirms that "P" of the pattern input by the user is the function indicating pattern corresponding to "PLAY", and "-" of the pattern input by the user is the operation indicating pattern to control the volume of a music that is being played (S710).

Figure 8C:
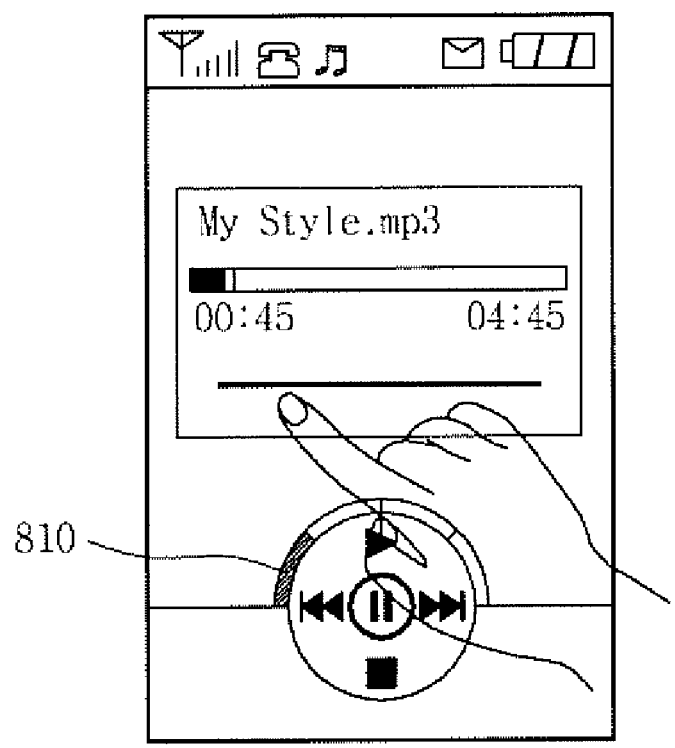

Therefore, the controller 140 plays a music file as illustrated in FIG. 8(c). At the same time, the controller 140 controls the volume of the music that is being played for a level corresponding with the length of "-", that is, the operation indicating pattern input by the user.

For example, if the user wants to turn the volume up by moving a volume bar 810, as illustrated in FIG. 8(c), the user inputs "-", the operation indicating pattern corresponding to the volume on the touchscreen 112. The user can then control the input length of "-" that is, the operation indicating pattern according to a desired volume. Accordingly, the controller 140 turns the volume up or down according to the length of "-", the operation indicating pattern input by the user.

Figure 8D:
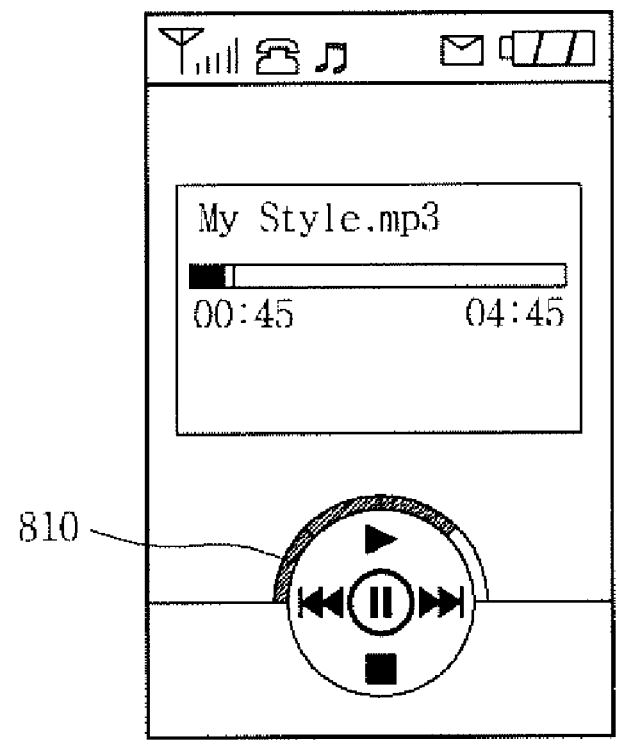

When the user inputs the operation indicating pattern length of "-", that is extended a certain length, the controller 140 moves the volume bar 810 in order to turn the volume up, as illustrated in FIG. 8(d). The controller 140 can control the level of operation depending on the length of the input operation indicating pattern. An example of which is described below with reference to FIGS. 9(a)-9(d).

Figure 9A:
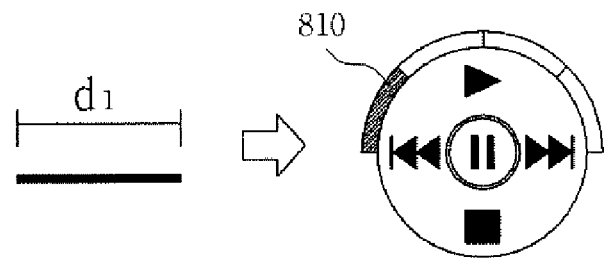
Figure 9B:
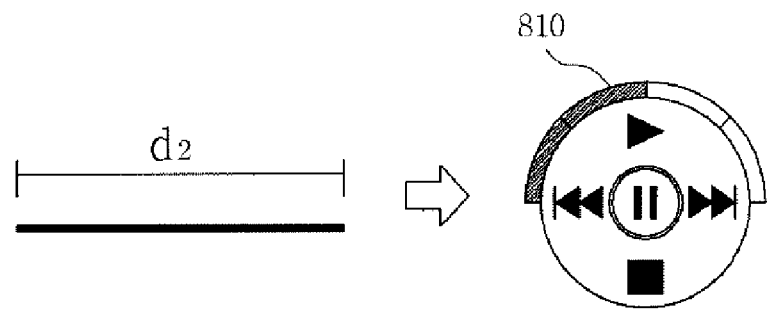

FIGS. 9(a)-9(d) illustrate how the level of operation is controlled according to the length of an input operation indicating pattern. For example, when a first length $d_1$ of the operation indicating pattern input by a user is short, as illustrated in FIG. 9(a), the controller 140 controls the volume control bar 810 to move slightly so that a low volume is output. Alternatively, when a second length $d_2$ of the operation indicating pattern input by a user is longer than the first length $d_1$, as illustrated in FIG. 9(b), the controller 140 controls the volume control bar 810 to move greater than the first length $d_1$, such that the volume is increased greater than the first length $d_1$ is output.

Figure 9C:
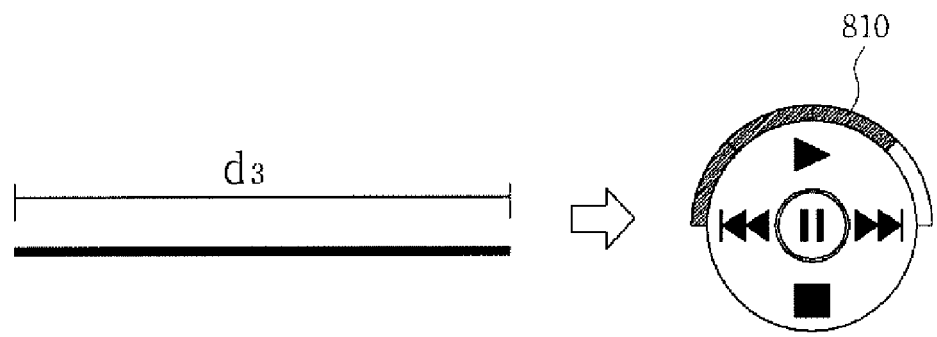

When a third length $d_3$ of the operation indicating pattern input by a user is greater than the second length $d_2$, as illustrated in FIG. 9(c), the controller 140 controls the volume control bar 810 to move greater than the second length $d_2$, such that a volume higher than the second length $d_2$ is output.

Figure 9D:
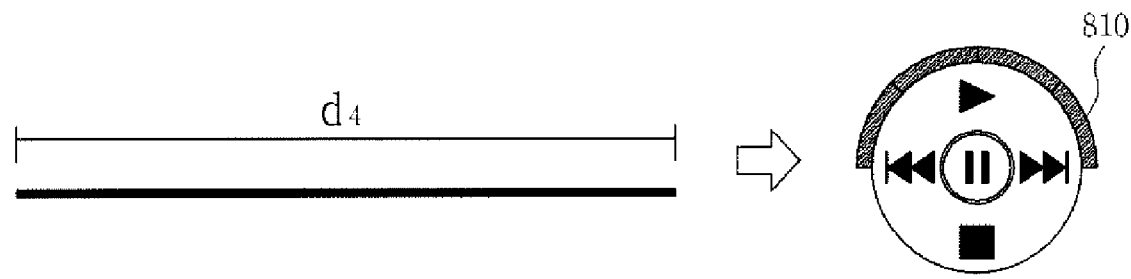

Finally, when a fourth length $d_4$ of the operation indicating pattern input by a user is greater than the third length $d_3$, as illustrated in FIG. 9(d), the controller 140 controls the volume control bar 810 to move greater than the third length $d_3$, such that the volume increased greater than the third length $d_3$ is output.

The controller 140 can control the length of the operation indicating pattern in a state where the user maintains the touch input on the touchscreen 112, and then moves the volume control bar 810 according to the length of the operation indicating pattern when the touch input is finished in order to control the volume.

However, alternatively, the controller 140 can efficiently control the length of the operation indicating pattern on the touchscreen 112. This is described below with reference to FIG. 10.

FIG. 10 illustrates an example in which the amount of operation is easily controlled when the operation indicating pattern is input. As illustrated in FIG. 10, the controller 140 can display a level bar 820, which enables a user to easily control the input amount of an operation when inputting the operation indicating pattern.

In this case, the controller 140 displays the level bar 820 after confirming that the user has input the function indicating pattern. Accordingly, the user can set the output of a desired volume while confirming the scale of the level bar 820.

FIGS. 11(a) and 11(b) illustrate a function indicating pattern and an operation indicating pattern of a picture view function input according to an embodiment of the present invention. As illustrated in FIG. 11(a), if a user inputs "3", that is, the function indicating pattern corresponding to the picture view function, the controller 140 executes a picture view function and displays a corresponding photograph on the touchscreen 112.

Thereafter, if the user inputs "-", that is, the operation indicating pattern for increasing the brightness of the photograph with the photograph being displayed on the touchscreen 112, the controller 140 increases the brightness of the photograph, as illustrated in FIG. 11(b). Even in this case, the level of an operation can be controlled according to the length of the operation indicating pattern as described above.

As previously described, when a user assigns a shortcut key for rapidly executing a function provided by the mobile terminal 100, the shortcut key can be assigned by allowing the user to input different patterns.

In the above-mentioned embodiments, it has been described that the method in which a user inputs the function indicating pattern and then inputs the operation indicating pattern to indicate an operation corresponding to a corresponding function is sequentially performed. However, the present invention is not limited thereto. An alternative embodiment is described below with reference to FIGS. 12(a) and 12(b).

FIGS. 12(a) and 12(b) illustrate an example in which the operation indicating pattern is input in a state where the function indicating pattern is not input. As illustrated in FIGS. 12(a) and 12(b), the controller 140 can execute a corresponding operation when a corresponding operation indicating pattern is a unique one of a plurality of patterns stored in the memory 120 when the operation indicating pattern is input before the function indicating pattern is input.

For example, as illustrated in FIG. 12(a), a user inputs "P", the operation indicating pattern to indicate a play operation of a music listening function with the function indicating pattern being not input. At this time, the controller 140 determines whether "P", the operation indicating pattern input by the user is a unique pattern, which is not duplicated in a plurality of patterns stored in the memory 120.

If, as a result of the determination, "P", the operation indicating pattern input by the user is a unique pattern, then the controller 140 plays music. However, if, as a result of the determination, "P", the operation indicating pattern input by the user is a pattern that is duplicated in the plurality of patterns stored in the memory 120, the controller 140 controls the touchscreen 112 to display a corresponding list, as illustrated in FIG. 12(*b*), such that the user can select a corresponding pattern from the list.

For example, "P", the operation indicating pattern input by the user can be a pattern to indicate the play operation in the music listening function. However, in the picture view function, "P", the operation indicating pattern can be set to perform an operation for displaying a total list of photographs.

In other words, if "P", the operation indicating pattern is not input with the function indicating pattern, the controller 140 controls the touchscreen 112 to display a list of "Music Listening Function→Play" and "Picture View Function→List View", that is, a pattern corresponding to the input operation indicating pattern. Accordingly, the user can easily perform the operation of a corresponding function by selecting one pattern from the list displayed on the touchscreen 112.

In the above mentioned embodiments, it has been described that the mode switch 132 is a side key button formed on the side of the mobile terminal 100. However, the present invention is not limited to the embodiment. An alternative embodiment is described below with reference to FIG. 13.

As illustrated in FIG. 13, the mode switch 132 can be displayed on one side of the touchscreen 112 in icon form. Thus, a user can set or input a function indicating pattern and an operation indicating pattern by pressing the mode switch 132 displayed on the touchscreen 112.

The mode switch 132 may be one of several key buttons provided by the mobile terminal 100, as well as a key button formed on the side or the icon form, or may be included in a voice recognition unit. In the case where the mode switch 132 is the voice recognition unit, a user can instruct mode switch through voice control.

Furthermore, in the above mentioned embodiments, it has been described that a user's touch input is performed through the touchscreen 112. However, the present invention is not limited to the embodiment.

When the touch panel is used as described above, the touch panel may not be included in the display 110, but may be included in the input unit 130, and the function indicating pattern and the operation indicating pattern input and processed the same as above.

While the invention has been described in connection with preferred and practical embodiments, it is to be understood that the invention is not limited to the disclosed embodiments, but, on the contrary, is intended to cover various modifications and equivalent arrangements included within the spirit and scope of the appended claims.

What is claimed is:

1. A method for executing a short-cut function through pattern recognition, the method comprising:
   receiving user input via contact with a touch device;
   analyzing a pattern of the user input;
   determining the input pattern as at least one of a function indicating pattern and an operation indicating pattern;
   performing a function corresponding to the function indicating pattern and an operation corresponding to the operation indicating pattern according to the determined at least one input pattern;
   displaying a list of operation indicating patterns associated with the executed function when the function corresponding to the function indicating pattern is performed; and
   controlling a level of the operation according to a length of the operation indicating pattern,
   wherein the input pattern is a short-cut to perform the function and the operation.

2. The method of claim 1, further comprising:
   storing a function indicating pattern corresponding to a particular function, and an operation indicating pattern corresponding to an operation to be performed according to the particular function,
   wherein analyzing the input pattern determines whether the input pattern comprises at least one of the stored function indicating pattern and the stored operation indicating pattern in order to determine the input pattern as at least one of the function indicating pattern and the operation indicating pattern.

3. The method of claim 2, wherein a plurality of function indicating patterns and operation indicating patterns, which can be set in the particular function, are stored, and the plurality of function indicating patterns and operation indicating patterns are set in the particular function by a user selection.

4. The method of claim 1, further comprising:
   determining whether a mode switch is selected prior to analyzing and determining the input pattern,
   wherein analyzing the input pattern classifies the input pattern as at least one of the function indicating pattern and the operation indicating pattern when the mode switch is selected.

5. The method of claim 4, wherein the mode switch comprises one of a voice recognition unit and a key input unit.

6. The method of claim 4, wherein the mode switch is displayed on the touch device as an icon.

7. The method of claim 1, wherein when the pattern is determined as the function indicating pattern, a level bar is displayed after the function corresponding to the function indicating pattern is performed, wherein the level bar indicates a level of an operation to be performed according to the performed function that is settable by a user.

8. The method of claim 1, wherein the function indicating pattern and the operation indicating pattern corresponding to the particular function are directly input on the touch device by a user.

9. The method of claim 1, wherein the operation corresponds to one of a volume control and a picture brightness control.

10. A mobile communication terminal, comprising:
    a display comprising a touch device and configured to receive user input via contact with the touch device; and
    a controller configured to:
    analyze a pattern of the user input;
    determine the user input pattern as at least one of a function indicating pattern and an operation indicating pattern;
    perform a function corresponding to the function indicating pattern and an operation corresponding to the operation indicating pattern according to the determination;

display a list of operation indicating patterns associated with the function on the display when the function corresponding to the function indicating pattern is performed; and control a level of the operation according to a length of the operation indicating pattern, wherein the input pattern is a short-cut to perform the function and the operation.

11. The mobile communication terminal of claim 10, further comprising:

a memory for storing a function indicating pattern corresponding to a particular function, and an operation indicating pattern corresponding to an operation to be performed according to the particular function, wherein the controller determines whether the input pattern comprises at least one of the stored function indicating pattern and the stored operation indicating pattern in order to determine the input pattern as at least one of the function indicating pattern and the operation indicating pattern.

12. The mobile communication terminal of claim 10, further comprising:

a mode switch for selecting to determine the input pattern, wherein the controller determines the input pattern as at least one of the function indicating pattern and the operation indicating pattern when the mode switch is selected.

* * * * *